(12) United States Patent
Levert et al.

(10) Patent No.: US 6,771,874 B2
(45) Date of Patent: Aug. 3, 2004

(54) TENSION-ASSISTED MOUNTING OF FIBERS ON A SUBSTRATE

(75) Inventors: Joseph A. Levert, Vista, CA (US); Michael Talmadge, Carlsbad, CA (US)

(73) Assignee: Otuma, Inc., Carlsbad, CA (US)

( * ) Notice: Subject to any disclaimer, the term of this patent is extended or adjusted under 35 U.S.C. 154(b) by 0 days.

(21) Appl. No.: 10/150,401

(22) Filed: May 17, 2002

(65) Prior Publication Data

US 2003/0133691 A1 Jul. 17, 2003

Related U.S. Application Data

(60) Provisional application No. 60/347,435, filed on Jan. 11, 2002.

(51) Int. Cl.[7] .............................. G02B 6/00; G02B 6/42
(52) U.S. Cl. .......................... 385/147; 385/30; 385/136
(58) Field of Search .......................... 385/30, 134, 136, 385/137

(56) References Cited

U.S. PATENT DOCUMENTS

| | | | | |
|---|---|---|---|---|
| 5,448,665 A | * | 9/1995 | Kershaw et al. | 385/30 |
| 5,805,757 A | * | 9/1998 | Bloom | 385/137 |
| 5,812,726 A | * | 9/1998 | Jinnai et al. | 385/137 |
| 5,926,599 A | * | 7/1999 | Bookbinder et al. | 385/137 |
| 6,483,979 B1 | * | 11/2002 | DeMartino et al. | 385/137 |
| 6,542,663 B1 | * | 4/2003 | Zhao et al. | 385/30 |
| 2002/0031323 A1 | * | 3/2002 | Hattori et al. | 385/137 |

* cited by examiner

*Primary Examiner*—John D. Lee
*Assistant Examiner*—Tina M Lin
(74) *Attorney, Agent, or Firm*—Fish & Richardson P.C.

(57) ABSTRACT

A method of placing a fiber on a substrate includes holding at least one fiber under tension, aligning the held fiber with a groove formed into a substrate, moving the substrate towards the fiber to place the fiber in the groove, fixing the position of the fiber under tension in the groove, and releasing the fiber.

44 Claims, 14 Drawing Sheets

US 6,771,874 B2

TENSION-ASSISTED MOUNTING OF FIBERS ON A SUBSTRATE

This application claims the benefit of U.S. Provisional Application No. 60/347,435 filed Jan. 11, 2002, the entire disclosure of which is incorporated herein by reference as part of this application.

BACKGROUND

This application relates to fiber devices with fibers engaged in grooves on a substrate. Fibers may be positioned into grooves formed into a surface of a semiconductor substrate to form various fiber devices. Typically, the placement of fibers into the grooves is performed manually by an operator. The final alignment of each fiber is dependent upon the individual skill of the operator.

Optical fibers are used to guide light from one location to another. The construction of a typical fiber includes a glass core that is surrounded by a glass cladding layer, the glass cladding layer is surrounded by a protective "buffer" layer (e.g., an acrylate-based plastic coating). The refractive index of the fiber core is higher than that of the cladding layer to confine the light. Therefore, light rays coupled into the fiber core within a maximum angle with respect to the axis of the fiber core are totally reflected at the interface of the fiber core and the cladding. This total internal reflection provides a mechanism for spatially confining the optical energy of the light rays in one or more selected fiber modes to guide the optical energy along the fiber core.

The guided optical energy in the fiber, however, is not completely confined within the core of the fiber. A portion of the optical energy can "leak" through the interface between the fiber core and the cladding via an evanescent field that essentially decays exponentially with the distance from the core-cladding interface. This evanescent leakage may be used to couple optical energy into or out of the fiber core, or alternatively, to perturb the guided optical energy in the fiber. A portion of the buffer and the fiber cladding may be removed and polished to form a coupling window to allow for optical access to the fiber core via an evanescent field of a guided mode supported by the fiber.

SUMMARY

This application describes several embodiments for "tension-assisted" alignment and mounting of a fiber in a groove formed in a substrate. In the described embodiments, prior to placing the fiber in a corresponding groove, the fiber is tensioned in a controlled manner. The fiber under tension is then aligned and positioned in the groove. In some of the embodiments, the fiber is also wrapped around a contour of the groove. An adhesive material is then applied in the groove to fix the position of the fiber after the adhesive is cured.

In some of the embodiments described, a suitable adhesive material is applied in the groove prior to mounting the fiber in the groove. In this case, before the adhesive is hardened, the fiber held under tension is placed in the adhesive within the groove and is wrapped around a contour of a groove. After the adhesive is cured, the fiber is fixed in the groove. A typical adhesive used is a ultraviolet-cured (UV-cured) epoxy that is cured after the fiber is positioned into the groove by the application of a UV light.

In some cases, after the fiber is mounted and fixed in the corresponding groove, the fiber is polished to remove a portion of the fiber cladding and/or a portion of the fiber core by an appropriate process such as a chemical-mechanical planarization (CMP).

In some of the described embodiments, tension-assisted mounting is used for aligning and mounting several fibers roughly simultaneously, i.e., aligning and placing several fibers into a parallel array of grooves formed in a substrate. Following placement into the grooves, the fibers can be attached to the substrate grooves by an adhesive that may be cured in all of the grooves roughly simultaneously (e.g., by applying a UV-light to a UV-curable adhesive). This is an advantage, since the curing time for some adhesives is several minutes. Following attachment to the substrate, the array of fibers may be polished roughly simultaneously, i.e., removing a portion of the fiber cladding and/or the fiber core of each fiber in a wafer-level fabrication process to achieve a high throughput.

The described embodiments are applicable to operations that may be automated to ensure repeatability, increase quality, and increase the throughput in fabrication of fibers on substrates. Moreover, the described embodiments are applicable to placing and handling fibers with machine automation.

DETAILED DESCRIPTION

Figure 1:
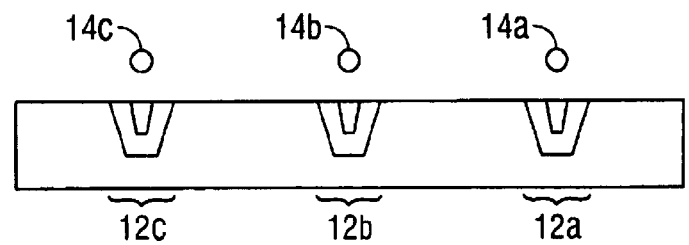
FIG. 1 shows an end view of a first grooved substrate.
Figure 2:
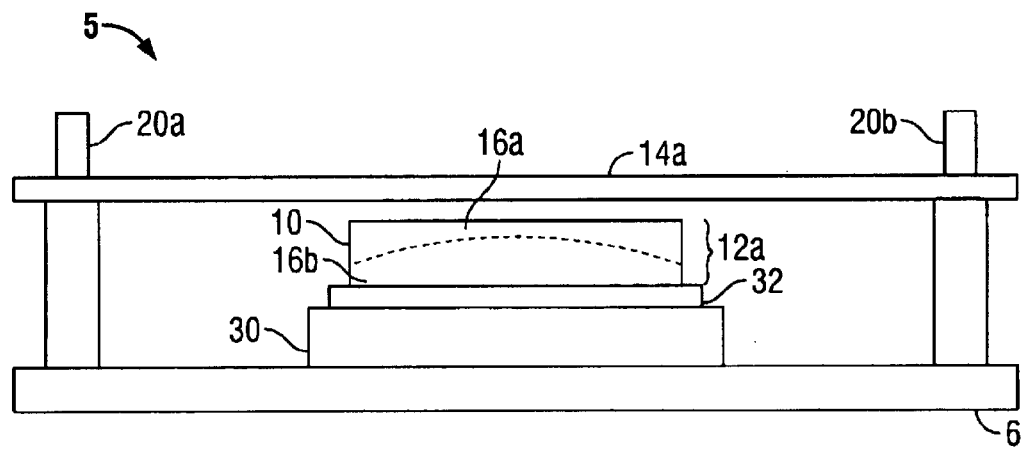
FIG. 2 shows a side view of a first embodiment of a fiber mounting apparatus in a "down" position.
Figure 3:
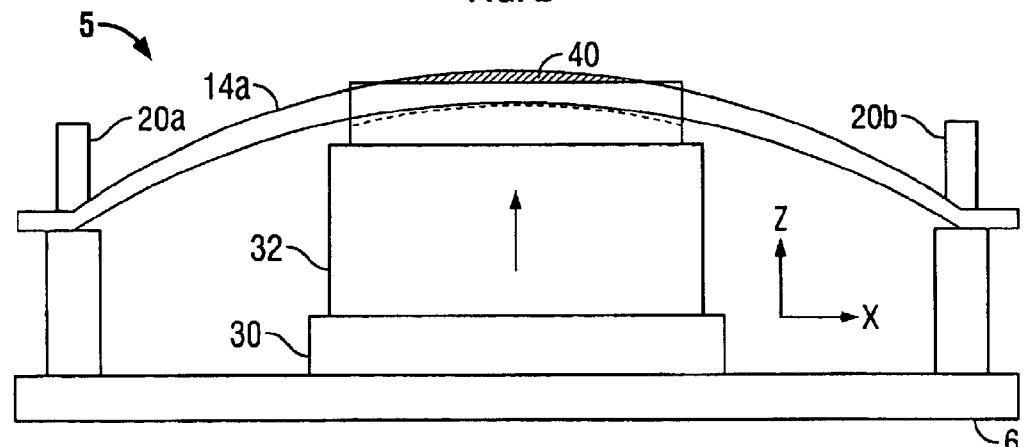
FIG. 3 shows the fiber mounting apparatus of FIG. 2 in an "up" position.

Referring to FIGS. 1–3, a fiber mounting apparatus 5 is used to hold a fiber 14a under tension between two clamps 20a and 20b each mounted to a base 6. Apparatus 5 includes a substrate holder 30 connected to base 6. Substrate holder 30 includes a movable stage 32 that is used to hold and move a substrate 10 towards fiber 14a until the fiber is placed into a groove 12a formed into substrate 10. In operation, an operator places substrate 10 onto movable stage 32 and also places fiber 14a under tension between clamps 20a and 20b. The operator then activates the movable stage 32, i.e., moving the substrate upwards, in the z-axis, until groove 12a contacts fiber 14a, allowing fiber 14a to wrap onto the contour of groove 12a. In this example of substrate 10, grooves 12a–12c are formed with a contour, i.e., a groove having a deeper section 16b at each side of substrate 10 and a shallower section 16a near the middle of substrate 10. Therefore, when fiber 14a is placed into groove 12a, an exterior section 40 (see FIG. 3) of fiber 14a is left above a top surface of substrate 10. Section 40 may later be removed by polishing section 40 parallel with the top surface of substrate 10.

This first embodiment of a fiber mounting apparatus 5 (described above) teaches a relatively simple way of holding a fiber under tension and accurately aligning the fiber to a substrate groove. The tension applied to the fiber ensures that a longitudinal axis of the fiber is held steady in the x-axis, this allows a simple and easily repeatable alignment of a grooved substrate to the fiber. As shown in FIGS. 2–3, apparatus 5 uses mechanical holders and movers to tension, align and place a fiber without ungainly manual operations that may damage the fiber, or cause a fiber to be mis-aligned to a substrate groove. In addition, the final z-axis "height" of the fiber with respect to the top surface of the substrate, is easily controlled by this method. In more detail, the z-axis height of the fiber is determined by the corresponding shape of the groove after the tensioned fiber is placed completely into that groove. Typically, the tension assisted mounting process may be used to achieve a z-axis fiber height, established by the groove geometry, with an error of less than 0.2 um.

Figure 4:
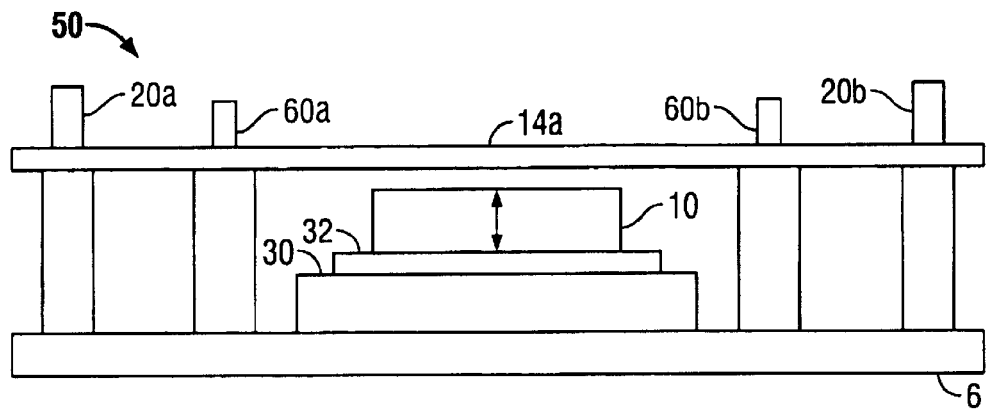
FIG. 4 shows a side view of a second embodiment of a fiber mounting apparatus.
Figure 5:
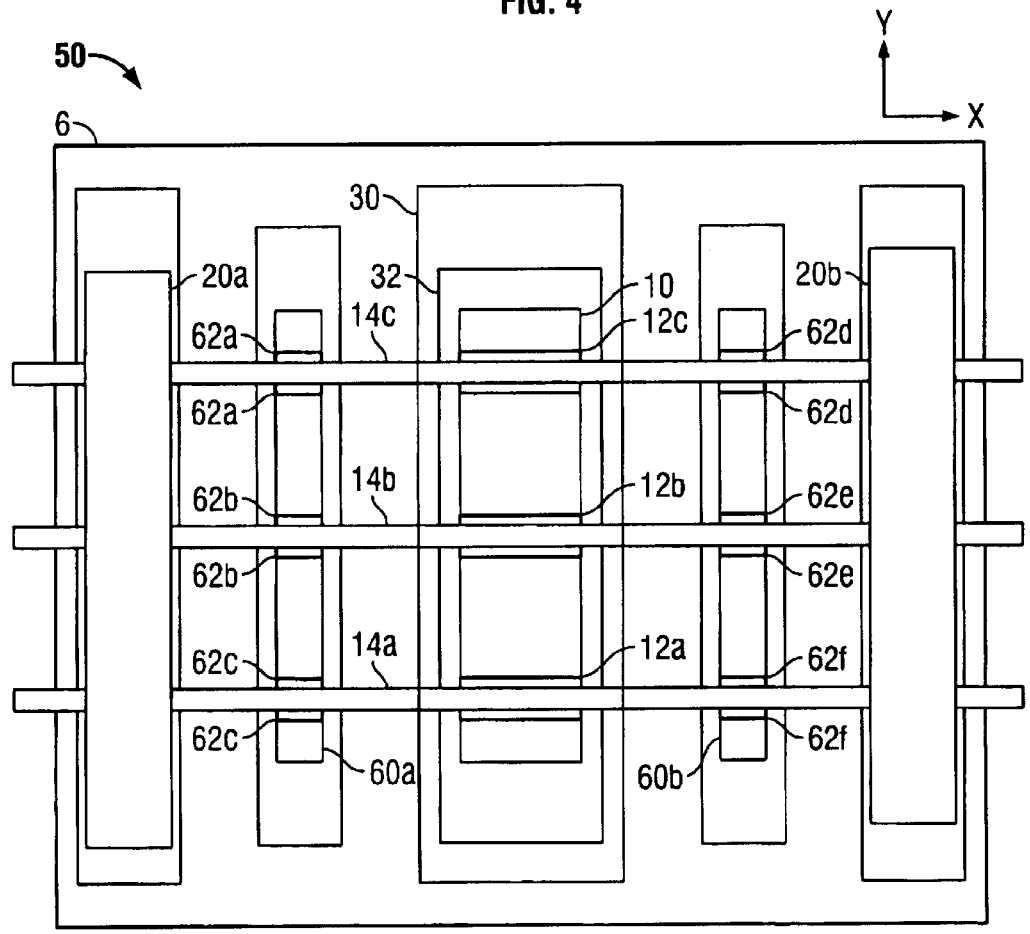
FIG. 5 shows a top view of the second embodiment.

Referring to FIGS. 4–5, a second embodiment of a fiber mounting apparatus 50 is shown. Apparatus 50 differs from apparatus 5 (see FIGS. 2–3) by the addition of a set of fiber alignment guides 60a and 60b mounted to base 6. In this example, fiber guides 60a and 60b each include a set of fingers 62a–62c and 62d–62f, respectively, that are used to roughly align fibers 14a–14c with grooves 12a–12c in the y-axis during loading of the fibers onto apparatus 50. To operate apparatus 50, an operator loads a substrate, such as substrate 10, onto movable stage 32, and also loads one or more fibers, such as fibers 12a–12c, aligning each fiber between a corresponding set of fingers 62a–62f, and finally clamping each fiber under tension between clamps 20a and 20b. Once apparatus 50 is loaded with substrate 10 and fibers 14a–14c, the operation of apparatus 50 is similar to that described in relation to apparatus 5. In more detail, the operator activates the movable stage 32, moving substrate 10 upwards (in the z-axis) until each of the grooves 12a–12c contacts each of the aligned fibers 14a–14c, respectively, causing each fiber 14a–14c to wrap onto the contour of each corresponding groove.

In an embodiment of apparatus 50, fiber alignment guides 60a and 60b and/or substrate mover 32 are adjustable in additional axes. In this case, an operator may adjust the x-axis, y-axis, z-axis, roll, pitch and/or yaw of the substrate 10 and/or the set of fibers, 14a–14c, to ensure proper alignment of the fibers to each groove before the substrate is moved upwards to contact the fibers. In this case, the substrate and/or set of fibers are adjusted so that the set of fibers 14a–14c contact the substrate grooves roughly simultaneously.

In an alternative embodiment, only one fiber alignment guide may be included on apparatus 50 to align fibers with substrate grooves.

Figure 6:
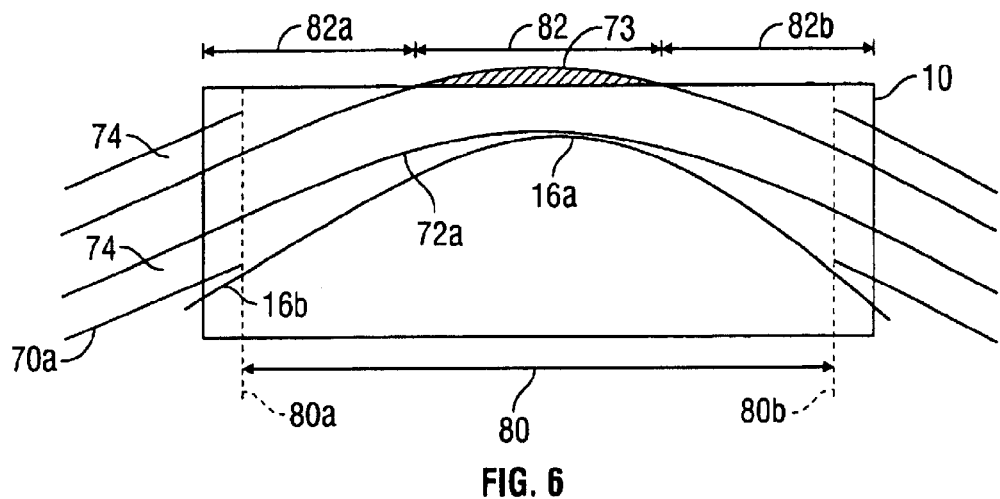
FIG. 6 shows a cross-sectional side view of a substrate and stripped fiber.

FIG. 6 shows a stripped fiber 70a that has been aligned and placed along the contour of groove 12a of substrate 10 (see FIGS. 1–3). In this example, fiber 70a includes a stripped section 80 where a buffer 74 has been removed to expose a fiber cladding layer 72a. After placement and attachment of fiber 70a to substrate 10, a section 73 of fiber cladding layer 72a (and the fiber core of fiber 70a) is projected above the top surface of substrate 10. Section 73 may later be removed to allow optical access to fiber cladding layer 72a (and the fiber core of fiber 70a).

Still referring to FIG. 6, typically fiber 70a is attached to substrate 10 by an adhesive applied before or after the fiber is placed into the groove. Glue area 82 shows the approximate location of the adhesive that is applied during a first stage of attachment of fiber 70a to substrate 10. Ends 80a and 80b, respectively, of buffer layer 74 are hereafter referred to as "buffer ends" 80a and 80b. In an embodiment, an additional adhesive, or filler glue, is applied to areas 82a and 82b to strengthen the attachment of buffer ends 80a and 80b to substrate 10.

Figure 7:
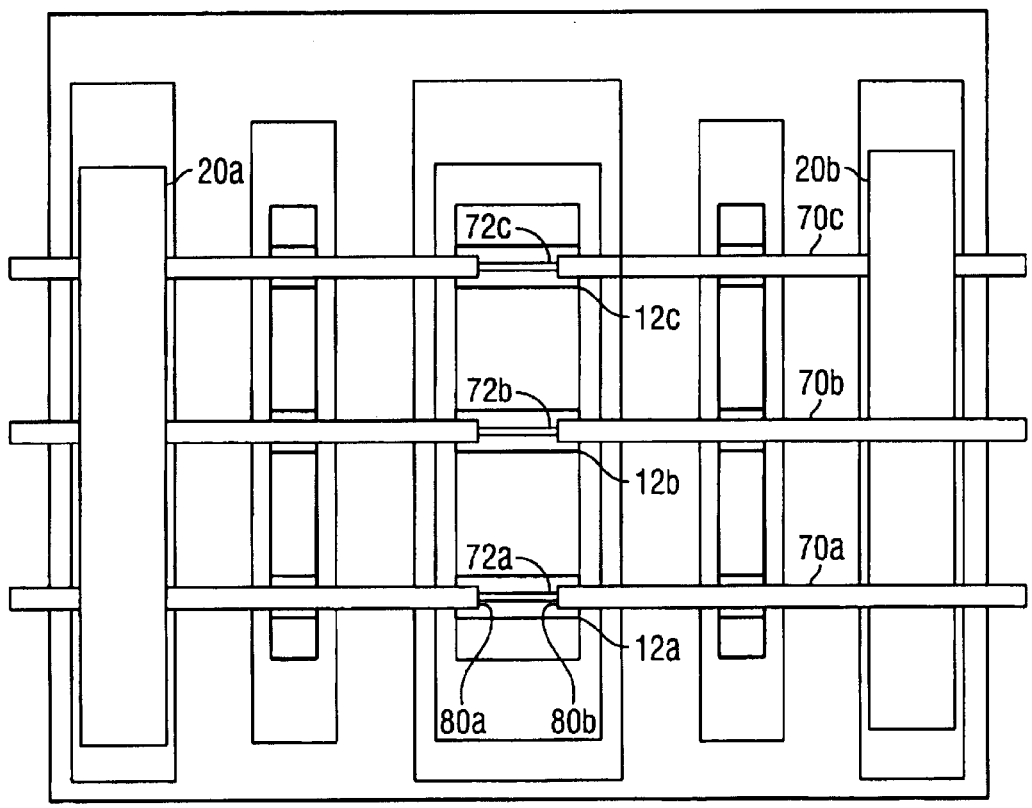
FIG. 7 illustrates the second embodiment being used to align stripped fibers to a grooved substrate.

Referring to FIGS. 6–7, apparatus 50 is shown being used to align stripped sections 72a–72c of a set of fibers 70a–70c, respectively, to a corresponding set of grooves 12a–12c formed in substrate 10. During operation of apparatus 50, the buffer ends of each stripped section 72a–72c, are aligned to contact substrate 10 within each groove. 12a–12c, respectively, so that the buffer ends will provide support to each stripped section of each corresponding fiber. As an example, buffer ends 80a and 80b of fiber 70a are shown aligned to contact substrate 10 within groove 12a. This way of aligning buffer ends together before placing the fibers into corresponding grooves reduces the possibility of damage to the fibers after the substrate and attached fibers are removed from the apparatus.

As shown in FIG. 6, when the fiber and substrate come into contact with each other, the fiber may be bent upwards at an angle to the top surface of the substrate. This bending of the fiber helps to ensure the fiber contacts the contour of the groove, such as groove 12a.

In the previously described embodiments, apparatus 5 and apparatus 50 included a set of fiber clamps 20a and 20b to hold one or more fibers under tension between the clamps. In an alternate embodiment, one or both of fiber clamps 20a and 20b are replaced by a set of spring activated clamps, i.e., a clamp to hold an end of each fiber and also having a spring attached to apply a controlled tension to that fiber. In this case, each fiber may be individually tensioned by its own spring clamp, thus ensuring approximately equal tension is applied to all of the fibers. In more detail, each spring clamp may be adjusted to apply roughly the same tension force on the fiber held by that clamp. This way of applying individually adjustable tension forces to each fiber in a set of fibers also ensures that the x-axis position of the fibers (and the aligned buffer ends) will remain uniform. Alternatively, each fiber in a set of fibers are tensioned with an appropriate weight attached to an end of each fiber.

Figure 8:
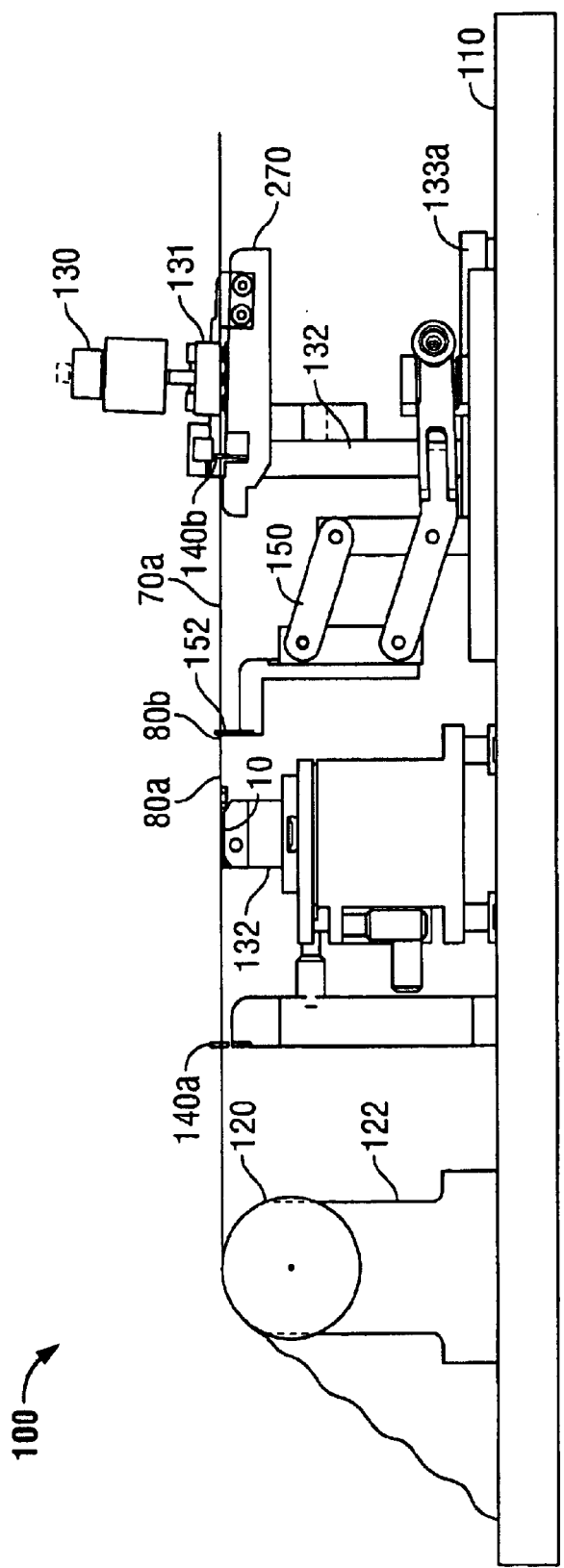
FIG. 8 shows a third embodiment of a fiber mounting apparatus in a "loaded" position.
Figure 9:
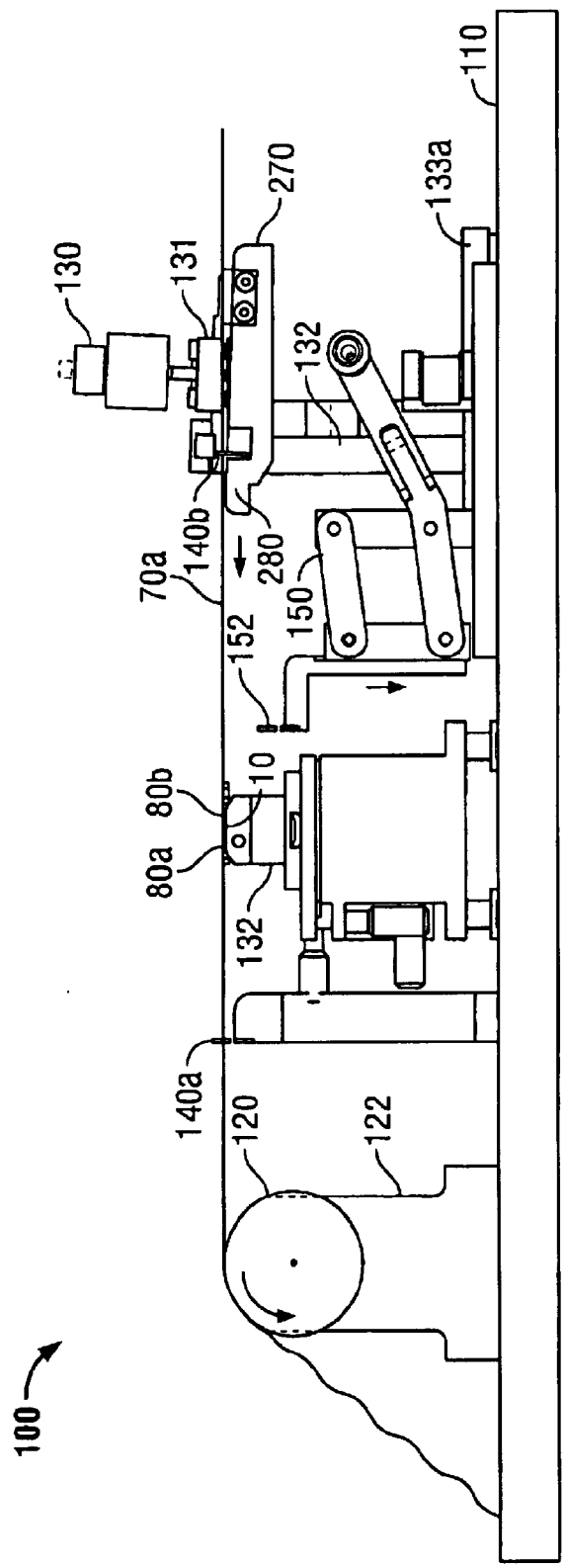
FIG. 9 shows the third embodiment of FIG. 8 in an "aligned" position.
Figure 10:
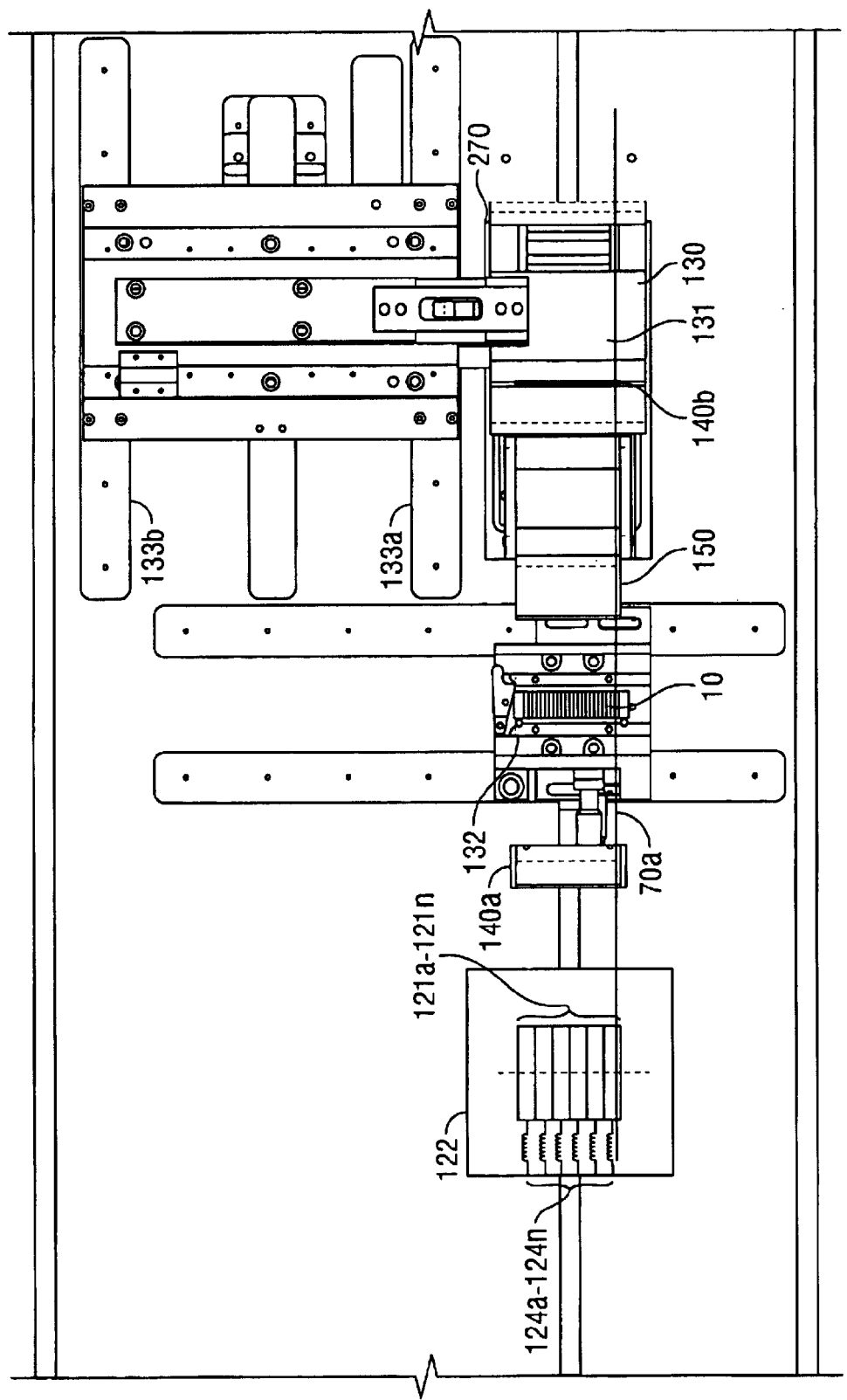
FIG. 10 shows a top view of the third embodiment shown in FIG. 8.
Figure 11:
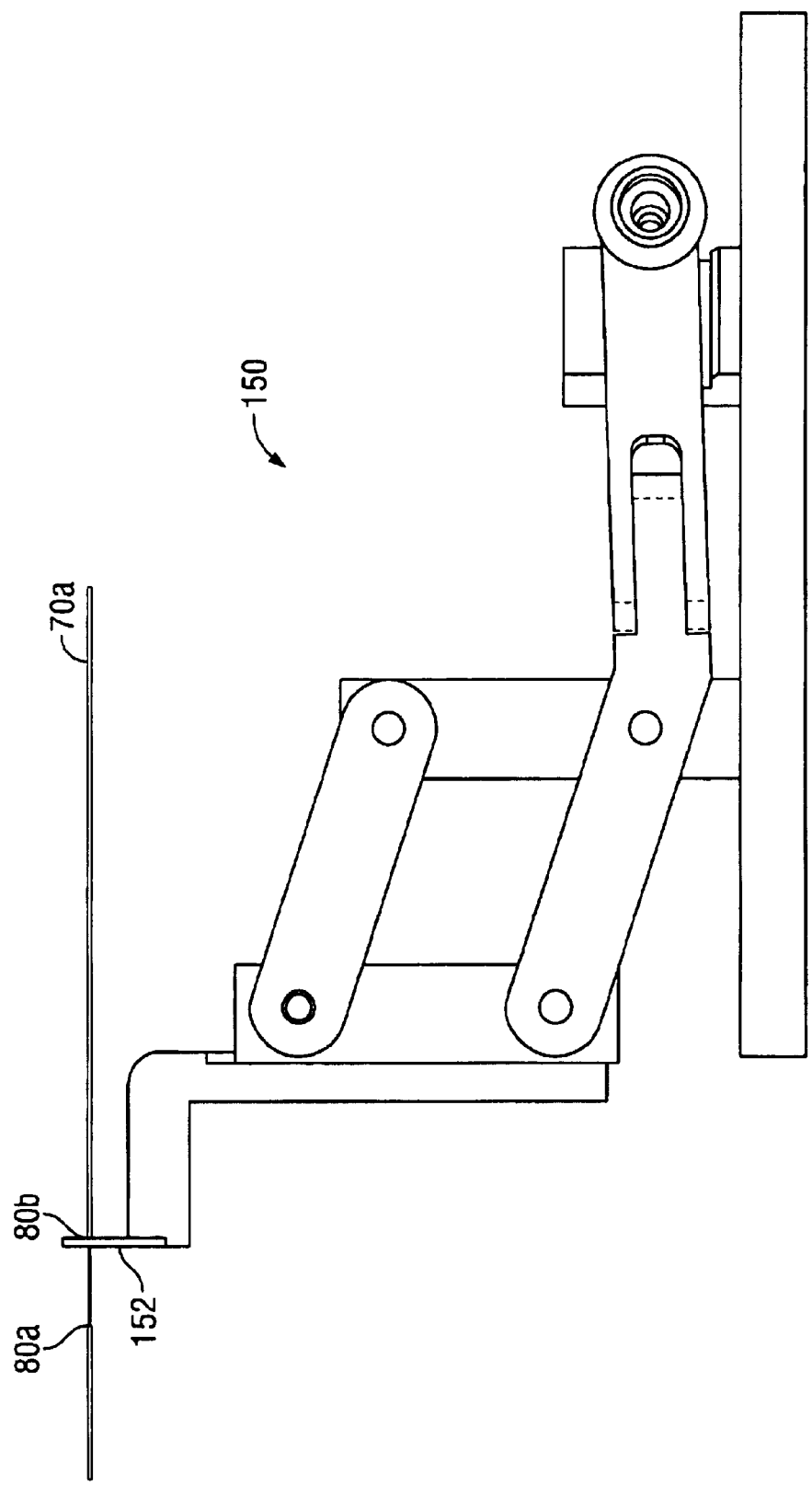
FIG. 11 shows a side view of a fiber buffer stop in an "up" position.
Figure 12:
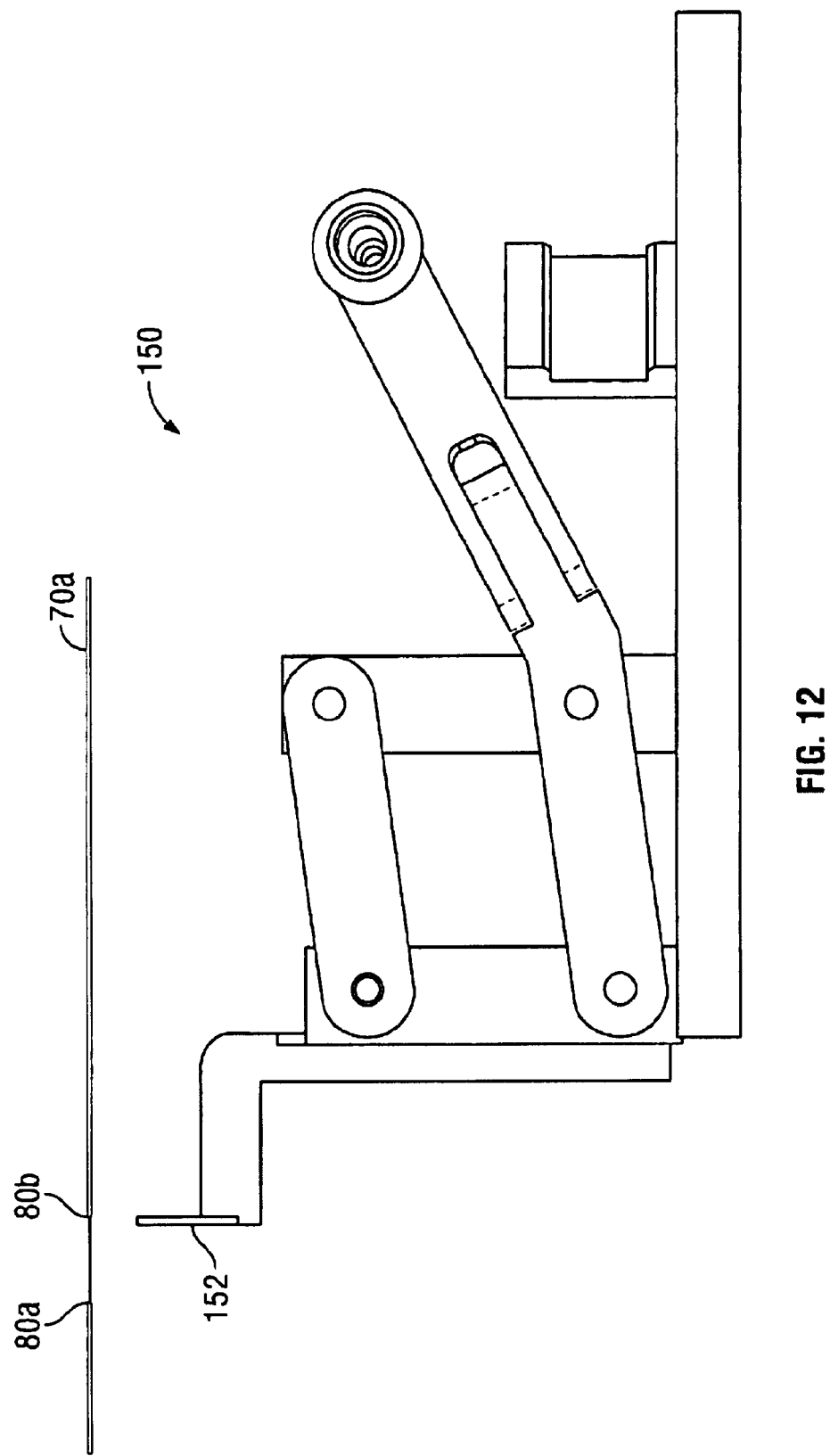
FIG. 12 shows the fiber buffer stop of FIG. 11 in a "down" position.
Figure 13:
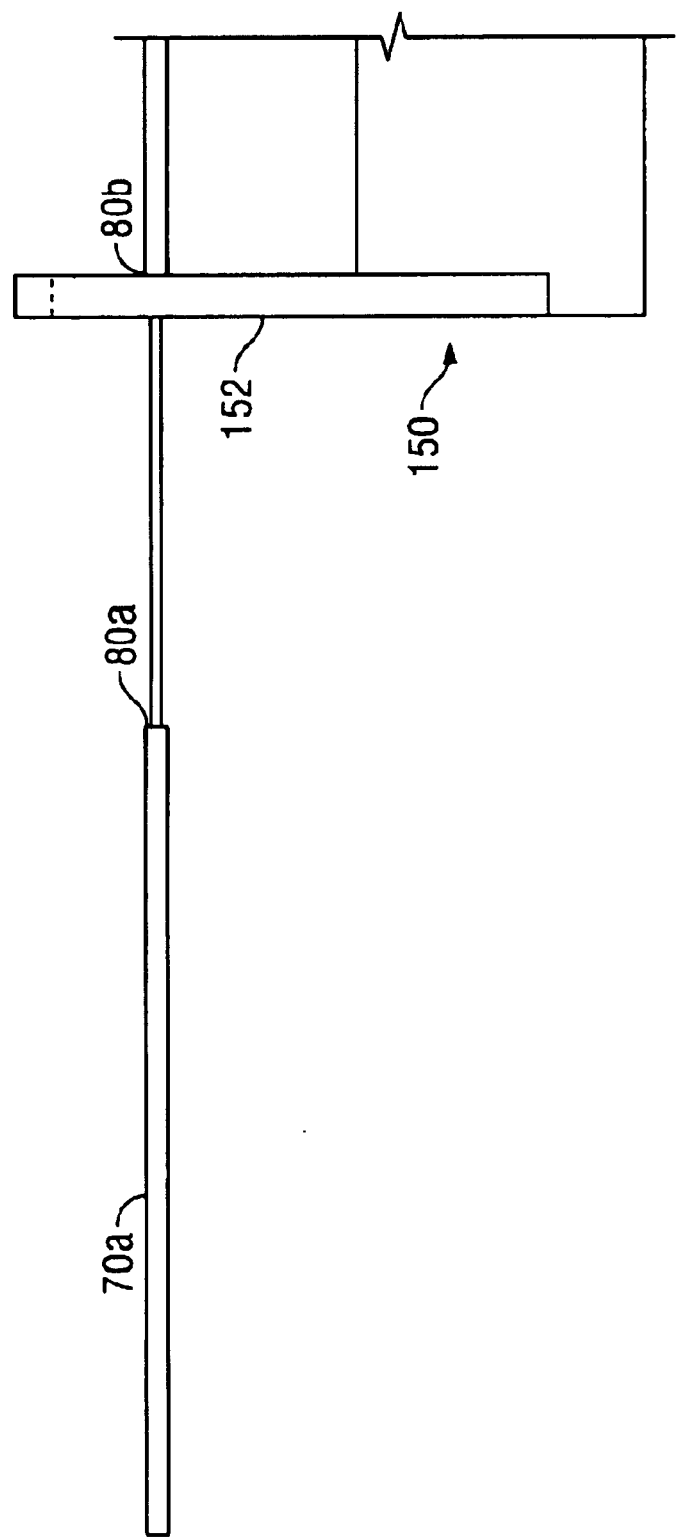
FIG. 13 shows an enlarged side view of a comb of the fiber buffer stop that corresponds to FIG. 11.
Figure 14:
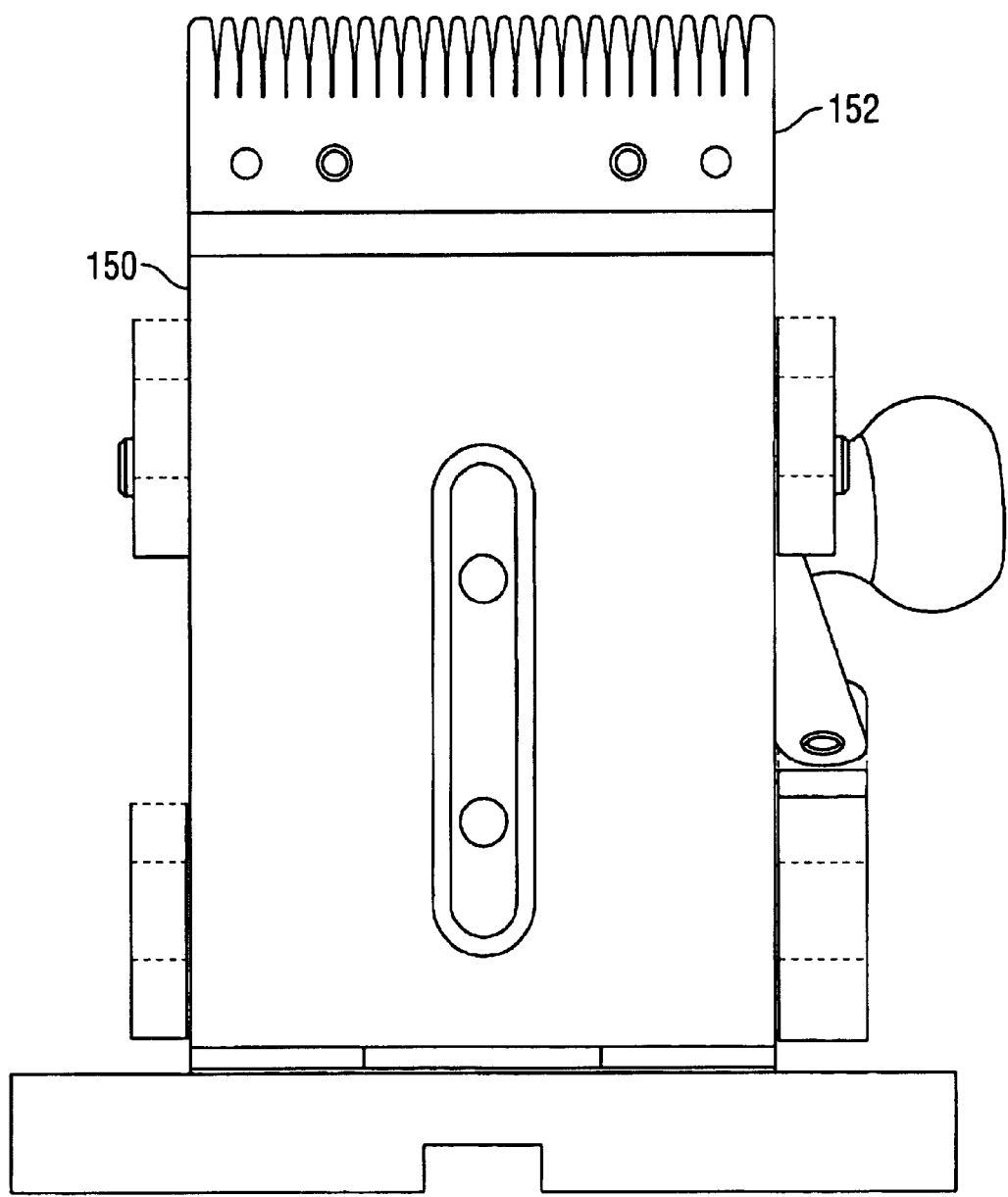
FIG. 14 shows an end view of the comb of FIG. 13.
Figure 15:
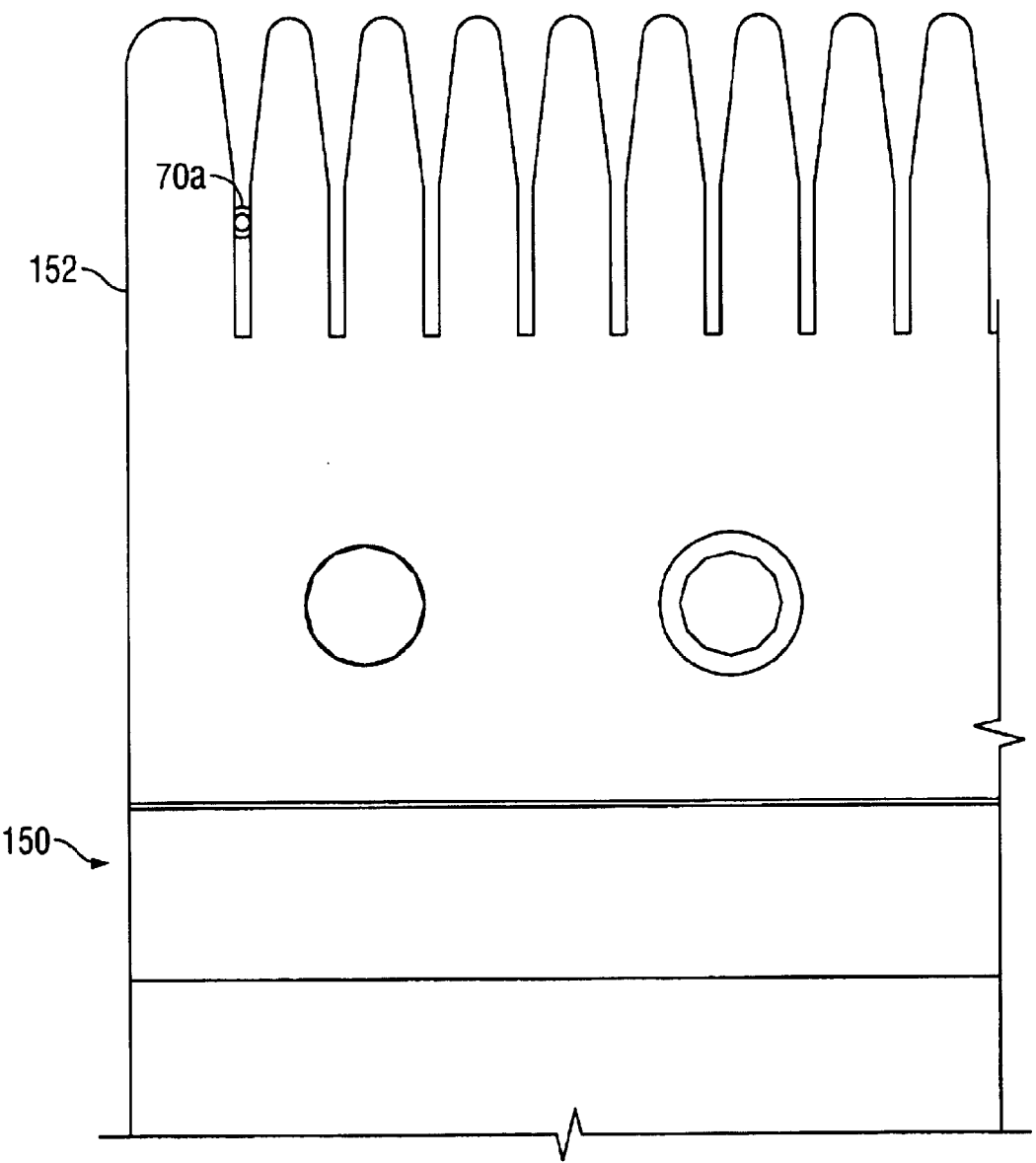
FIG. 15 shows an enlarged end view of the comb of FIG. 14.

Referring to FIGS. 8–10, a fiber mounting apparatus 100 is shown. Apparatus 100 has similar features to apparatus 50 described previously, i.e., apparatus 100 includes a base 110, a a movable substrate stage 132, first fiber clamp 120, a second fiber clamp 130, and a set of fiber guides 140a and 140b. In this embodiment, first fiber clamp 120 includes a set of parallel clamping wheels 121a–121n, each attached to base 110 by upright 122. Each of the clamping wheels 121a–121n are connected to a spring 124a–124n, respectively (see FIG. 10). Each clamping wheel 121a–121n may be used to hold a first end of a fiber and apply a tension force to that fiber being held at a second end of the fiber by second fiber clamp 130. In this embodiment, second fiber clamp 130 includes an upper clamping block 131 that is lowered towards a corresponding lower clamping plate 270 to hold a fiber. Second fiber clamp includes an upright 132 that is connected to slide along rails 133a and 133b in the x-axis towards and from first fiber clamp 120.

Now also referring to FIGS. 11–15, in an embodiment, apparatus 100 includes a buffer stop mechanism 150 that is used to align the buffer ends of stripped sections of a set of fibers with respect to each other. In this embodiment, during operation of apparatus 100, buffer stop mechanism 150 is placed in an "up" position by an operator (see FIG. 11). The operator then loads each fiber, such as fiber 70a, onto apparatus 100, aligning each fiber between a corresponding set of fingers of alignment guides 140a and 140b, and also aligning buffer ends 80a–80b of each fiber so that are roughly aligned in the x-axis with a corresponding set of fingers on buffer stop fence 152. As each fiber is loaded on to apparatus 100, the operator inserts a first end of each roughly positioned fiber into a corresponding clamping wheel 121a–121n. Once all of the fibers are loaded and clamped to a clamping wheel 121a–121n, the operator moves the set of clamping wheels to move the buffer ends of each fiber against fence 152, thereby aligning the buffer ends of all of the fibers in the x-axis. A second end of each fiber is then clamped by clamp 130 to maintain the alignment of the buffer ends in the x-axis, i.e., the buffer ends aligned against fence 152. Buffer stop mechanism 150 is then placed in a "down" position (see FIG. 12), i.e., lowering fence 152 away from the loaded fibers. At this point, clamping wheels 121a–121n are advanced to gently tension the fibers and to move the aligned buffer ends (and stripped sections of the fibers) over the grooves formed in substrate 10. Upper clamping block 131 can then be lowered towards clamping plate 270 to hold the fibers together and thereby maintaining the relative position of the aligned buffer ends. Next, second fiber clamp 130 may be moved along rails 133a and 133b, in order to move the stripped section of the set of fibers over the substrate grooves. Alternatively, substrate holder 131 may be used to move substrate 10 in the x-axis direction under the stripped sections of the held fibers. At this point, the stripped sections of the fibers are aligned with grooves 12a–12c of substrate 10, therefore, substrate 10 may be raised, placing each of the tensioned fibers into the corresponding grooves roughly simultaneously. Similar to the previous embodiments described, an adhesive may be applied before or after the fibers are inserted into the grooves to permanently attach the fibers to the substrate.

In an alternate embodiment, clamp 130 is a movable stage that may be moved in the x-axis, therefore, after the buffer ends are aligned relative to each other clamp 130 may be moved towards substrate holder 132 to align the stripped sections of the fibers over the substrate grooves.

Figure 16:
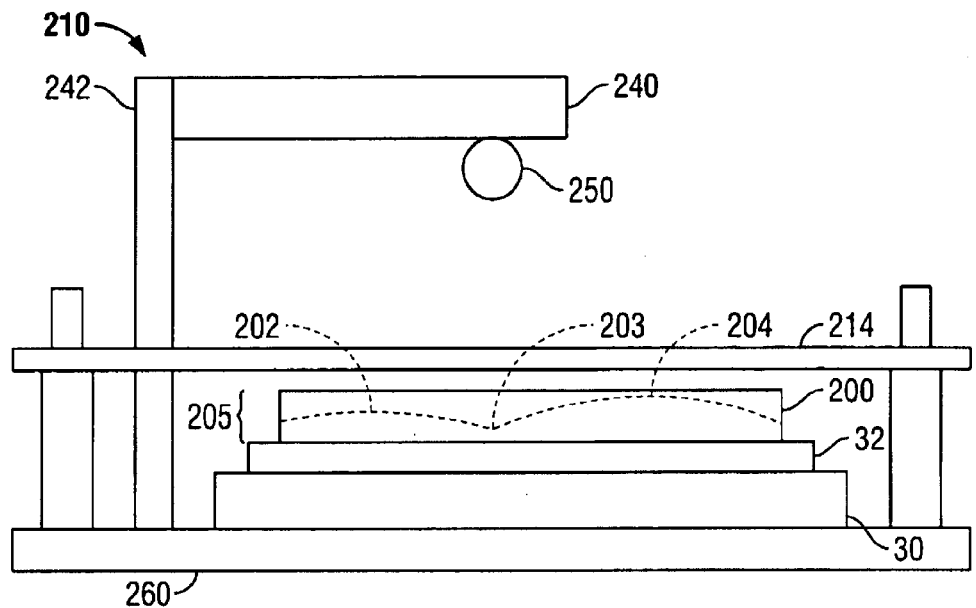
FIG. 16 shows a fourth embodiment of a fiber mounting apparatus in a "down" position.
Figure 17:
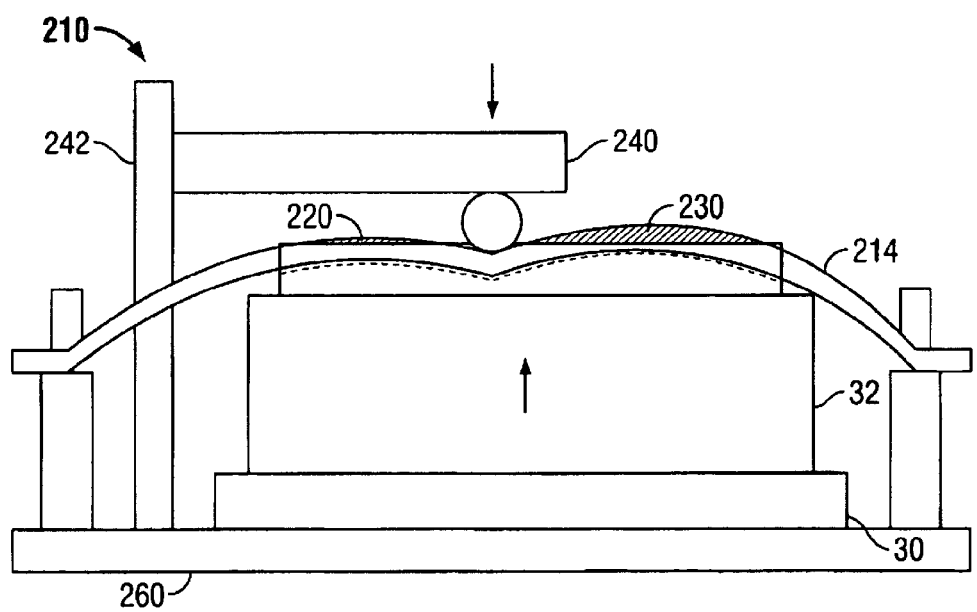
FIG. 17 shows the fourth embodiment in an "up" position.

Referring to FIGS. 16–17, of a substrate 200 includes at least one groove having a varied groove geometry, i.e., a groove formed in the substrate with varying depths along the length of the groove. In this example, groove 205 has two raised sections 202 and 204 which are formed to different depths relative to the top surface of substrate 200. Groove 205 also has a lowered section 203 near the center of substrate 200. Therefore, when a fiber 214 is placed completely into groove 205, i.e. following the contour of groove 205, sections 220 and 240 project two different amounts of the overall fiber diameter of fiber 214 above the top surface of substrate 200. Therefore, if sections 220 and 240 are removed even with the top surface, a different amount of the fiber cladding or fiber core will be exposed and accessible for optical coupling, i.e., to couple optical energy into or out of the fiber core, or alternatively, to perturb the guided optical energy in the fiber. Many other varied groove geometries are possible. For example, the groove in the substrate can be of the same height with a deeper center section, or the groove can have multiple raised sections with each raised section of a different height.

Still referring to FIGS. 16–17, in an embodiment, an apparatus 210 includes a movable upper arm 240 connected to upright 242 that is connected to base 260. Upper arm 240 includes a push-down ball 250 connected to a lower surface of arm 240. In operation, an operator loads a fiber 214 onto apparatus 210, aligning the fiber with groove 205, then raises substrate 200 until groove 205 contacts fiber 214. At this point upper arm 240 is lowered until push-down ball 250 contacts fiber 214 and pushes the fiber against lowered section 203. Instead of using a push-down ball 250, a cylinder or other appropriately shaped device could be used to contact the fiber when the upper arm is lowered.

In an alternate embodiment, apparatus 220 includes at least two independently adjustable upper arms (not shown). In this case, the upper arms may be used to contact individual fibers, i.e., to conform to the geometry of each corresponding groove.

In the embodiments described, a substrate holder 30 included a movable substrate stage 32 used to move a substrate in the z-axis, i.e., to move a substrate upwards towards a tensioned fiber held above the substrate. In an alternate embodiment, one or more of the fiber clamps could be implemented as movable stages, i.e., movable in the z-axis, so that a tensioned fiber could be moved downwards towards a stationary substrate.

In an embodiment, either the movable substrate stage or one or more of the fiber clamping stages is configured to move independently in the z-axis, i.e., to adjust the angle of a fiber held relative to the top surface of a substrate. As an example, if a fiber includes grooves that are deeper on one edge of the substrate than the other the adjustable fiber clamping stages would allow an adjustment of the angle of the held fiber relative to the substrate, therefore the held fiber would contact the groove at an appropriate corresponding angle.

Figure 18:
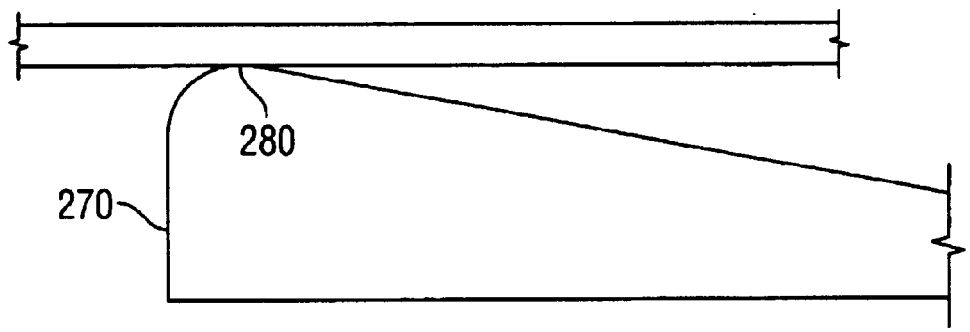
FIG. 18 shows a side view of a fiber clamping table.
Figure 19:
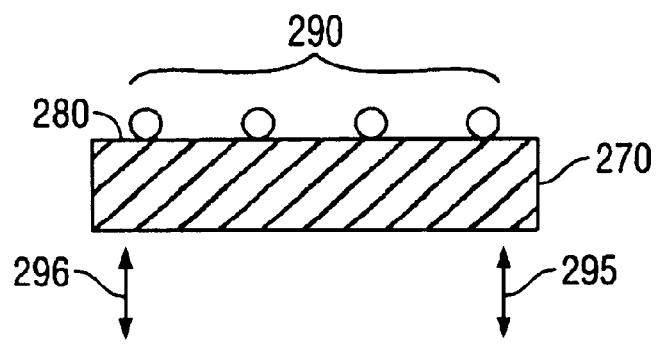
FIG. 19 shows a front view of the fiber clamping table of FIG. 18.

Still referring to FIG. 9, and also referring to FIGS. 18–19, in an embodiment, second fiber clamp 130 includes a lower clamping plate 270 that has a radiused front surface 280. During operation of apparatus 100, a set of fibers 290 is clamped between upper block 131 and clamping plate 270. Each of the fibers in the set of fibers 290 contacts plate 270 only at a single point along radiused surface 280. Therefore, each of the fibers in the set extends tangentially from radiused surface 280 towards first fiber clamp 120. Clamping plate 270 may be configured to allow a z-axis adjustment to each end 295 and 296 of plate 270. By mounting the set of fibers against plate 270 having a radiused front surface 280, the single point of contact between each fiber and plate 270 allows a relatively simple z-axis adjustment of the set of fibers without causing any contact of the fibers to any other portion of plate 270.

In an alternate embodiment, clamping plate 270 is divided into individually adjustable segments, each contacting one or more fibers. The individually adjustable segments allow each segment to be moved in the z-axis, thereby moving each fiber contacting that segment to be moved in the z-axis, which allows those individual fibers to be adjusted to the geometry of corresponding grooves on a substrate.

In an embodiment, a set of fibers may be loaded onto one of the previously described fiber loading apparati using a fiber magazine (not shown). In this case, the fiber magazine is used to hold and present a set of fibers in approximate alignment during the loading of a fiber loading apparatus. Following the clamping of the fibers onto a fiber loading apparatus, the fiber magazine may be removed, or, alternatively the fiber magazine may stay in place during placement and attachment of the fibers onto a substrate, followed by the removal of the fiber magazine and attached substrate. The use of a fiber magazine to simultaneously load a set of fibers onto a fiber loading apparatus allows faster operation of the loading and attachment of multiple fibers to a multiple-grooved substrate.

Figure 20:
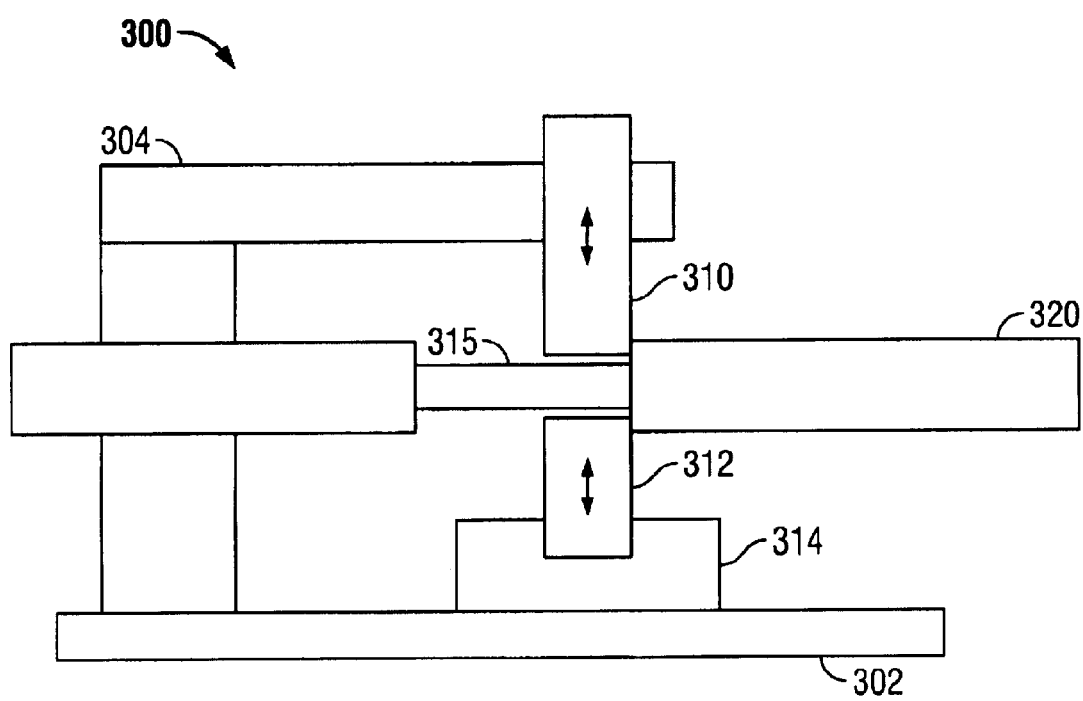
FIG. 20 shows an embodiment of a buffer stop.

Buffer stop mechanism 150 (see FIGS. 11–15) is one example of a device that may be used to align buffer ends of stripped sections of a set of fibers. Referring to FIG. 20, in an alternate embodiment, a buffer stop 300 includes a first slidable block 310 connected to slide up and down on an arm 304 attached to a base 302, and a second slidable block 312 connected to slide up and down on a lower block 314 attached to base 302. In this embodiment, block 310 is lowered and block 312 is raised, and buffer ends of stripped sections (e.g. stripped section 315 of fiber 320) of a set of fibers are aligned against the blocks 310 and 312. After aligning the buffer ends, block 310 is raised and block 312 is lowered to allow the fibers to be moved (or for a substrate to be moved), to contact the grooved substrate. Block 310 and block 312 may be constructed of a plastic material, or another suitable material that will not damage the cladding layer or buffer ends of a set of fibers.

Some of the embodiments described allow for loading and aligning several fibers to a set of substrate grooves roughly simultaneously. This "parallel" loading speeds the assembly process, since individual fibers do not necessarily need to be manually loaded and aligned. Furthermore, by placing several fibers into a set of grooves roughly simultaneously, an entire set of fibers can be attached to the substrate in a single operation. That is, adhesive can be placed in the grooves just prior to placing a set of fibers in the grooves, or, placed over the fibers after the fibers are positioned in the grooves. At this point the adhesive can be cured in all of the grooves roughly simultaneously (e.g., by applying a UV-light to a UV-curable adhesive or by a heated substrate stage for heat cured adhesives). This is an advantage, since the curing time for some adhesives is several minutes.

Other embodiments not described herein are also within the scope of the following claims.

What is claimed is:

1. A method, comprising:
   holding at least one fiber under tension;
   aligning the held fiber with a groove formed into a substrate, wherein the groove is contoured in the substrate;
   moving the substrate towards the fiber to place the fiber in the groove;
   fixing the position of the fiber under tension in the groove; and
   releasing the fiber.

2. The method of claim 1, wherein the moving comprises:
   moving the substrate to bend the fiber around a contour of the groove.

3. The method of claim 2, wherein the holding comprises:
   holding a fiber having a stripped section, wherein the stripped section is aligned and placed within the groove.

4. The method of claim 3, wherein the fiber has a buffer end corresponding to each end of the stripped section, and wherein the method further comprises contacting at least one buffer end with a section of the groove.

5. The method of claim 2, wherein the aligning comprises:
   using at least one alignment guide to align the fiber in an axis perpendicular to a longitudinal axis of the fiber.

6. The method of claim 5, wherein the alignment guide comprises a comb-shaped guide that is adapted to align at least two fibers roughly simultaneously with two corresponding grooves formed on a substrate.

7. The method of claim 2, wherein the substrate holder comprises an adjustable stage, the method further comprising:
   adjusting the position of the substrate to further align the fiber to the groove before moving the substrate to contact the fiber.

8. The method of claim 2, wherein the fixing comprises:
   curing an adhesive material applied to the fiber.

9. A method, comprising:
   holding at least one fiber under tension;
   aligning the held fiber with a groove formed into a substrate, wherein the groove is contoured in the substrate;
   moving the substrate towards the fiber to place the fiber in the groove;
   fixing the position of the fiber under tension in the groove;
   releasing the fiber, wherein a set of fibers are aligned to a substrate having a set of corresponding parallel grooves formed on a top surface; and
   loading the set of fibers roughly simultaneously.

10. The method of claim 9, further comprising:
    curing an adhesive in each of the grooves roughly simultaneously.

11. The method of claim 2, wherein a set of stripped fibers are aligned to a substrate having a set of corresponding parallel grooves formed on a top surface, the method further comprising:
    aligning a buffer end of at least two of the set of fibers before moving the substrate into contact with the fibers.

12. The method of claim 9, wherein the aligning of the buffer ends comprises aligning the buffer ends of the set of fibers against a buffer stop before moving the substrate to contact the fibers.

13. The method of claim 12, further comprising:
    moving the set of aligned fibers roughly in unison to align the stripped sections with the grooves.

14. The method of claim 12, further comprising:
    moving the substrate to align the grooves with the stripped sections of fiber before moving the substrate to contact the fibers.

15. A method, comprising:
    holding at least one fiber under tension;
    aligning the held fiber with a groove formed into a substrate, wherein the groove is contoured in the substrate;
    moving the substrate towards the fiber to place the fiber in the groove;
    fixing the position of the fiber under tension in the groove;
    releasing the fiber, and;

applying the tensioning force to the fiber with a spring, wherein the moving comprises moving the substrate to bend the fiber around a contour of the groove.

16. The method of claim 15, further comprising holding the fiber by a clamp connected to a spring that is used to apply the tensioning force to the fiber.

17. The method of claim 15, wherein a plurality of clamps are each connected to a corresponding plurality of springs to apply tensioning forces to each of a set of fibers.

18. The method of claim 2, wherein the holding comprises:

applying individual tensioning forces to each of a plurality of fibers with mechanical holders and tensioning clamps, and wherein the plurality of fibers contact the substrate simultaneously.

19. A method, comprising:

holding at least one fiber under tension;

aligning the held fiber with a groove formed on a substrate, wherein the groove is contoured in the substrate;

moving the fiber towards the groove to place the fiber in the groove;

fixing the position of the fiber under tension in the groove;

releasing the fiber; and moving the fiber to bend the fiber around a contour of the groove.

20. A method, comprising:

aligning a set of fibers under tension with a set of parallel grooves formed on a substrate, wherein the grooves are contoured in the substrate;

moving each of the set of fibers towards a groove to place each fiber in an individual groove, wherein the fibers contact the substrate grooves simultaneously;

fixing the positions of each of the fibers under tension in the individual groove;

releasing each of the fibers; and moving the fibers to bend the fibers around the contours of the grooves.

21. The method of claim 19, the method further comprising:

aligning a set of stripped fibers to a substrate having a set of corresponding parallel groves formed on a top surface; and aligning a buffer end of at least two of the set of fibers before moving the fiber to contact the grooves.

22. The method of claim 21, wherein the aligning of the buffer ends comprises aligning the buffer ends of the set of fibers against a buffer stop before moving the fiber to contact the groves.

23. The method of claim 22, further comprising:

moving the set of aligned fibers roughly in unison to align the stripped sections with the grooves.

24. The method of claim 22, further comprising:

moving the substrate to align the grooves with the stripped sections of fiber before moving the fiber to contact the grooves.

25. An apparatus comprising:

a base;

a first fiber clamp;

a second fiber clamp, wherein at least one of the first and second fiber clamp further comprises a clamp connected to a spring used to apply the tensioning force to the fiber and a lower clamping plate to contact the fiber, wherein the lower clamping plate comprises an adjustable segment; and a substrate holder, the substrate holder being attached to the base and adapted to hold a substrate having a groove formed into the surface of the substrate, wherein the first and second clamps are adapted to hold a fiber under tension, wherein the groove is configured to receive the fiber, and wherein the groove is contoured to bend the fiber.

26. The apparatus of claim 25, wherein the fiber has a stripped section, and wherein, during operation of the apparatus, the stripped section is configured to be aligned with and placed into the groove.

27. The apparatus of claim 26, wherein the fiber has a buffer end corresponding to each end of the stripped section, and wherein at least one buffer end of the fiber is adapted to contact the substrate.

28. The apparatus of claim 25, further comprises:

an alignment guide adapted to align the fiber in a axis parallel to the axis of the groove and perpendicular to a longitudinal axis of the fiber.

29. The apparatus of claim 28, wherein the alignment guide comprises a comb-shaped guide that is configured to align at least two fibers roughly simultaneously with two corresponding grooves formed on a substrate.

30. The apparatus of claim 25, wherein the substrate holder comprises:

an adjustable stage, the stage being adjustable to hold and move the substrate towards the fiber.

31. The apparatus of claim 25, further comprising a plurality of fiber guides, wherein each of the fiber guides comprise a set of fingers adapted for fiber alignment.

32. The apparatus of claim 31, further comprising:

a plurality of fibers under tension between a plurality of fiber clamps.

33. The apparatus of claim 25, further comprising:

a buffer stop to align buffer ends of at least two stripped fibers before moving the substrate into contact with the fibers.

34. The apparatus of claim 33, wherein at least one of the first and second fiber clamps further comprises:

a plurality of clamps each connected to a corresponding plurality of springs to apply tensioning forces to each of a set of fibers.

35. The apparatus of claim 34 wherein the apparatus is adapted to apply an individual tension force for each fiber in the set of fibers.

36. The apparatus of claim 25 further comprising a push-down ball to contact the fiber.

37. The apparatus of claim 25 further comprising at least two independently adjustable arms to contact individual fibers to conform the fibers to the geometry of a corresponding groove.

38. The apparatus of claim 25 wherein the first and second clamps are adapted to be moved in a direction toward the substrate.

39. The apparatus of claim 38 wherein the first and second clamps are adapted to be adjusted to an angle of the fiber under tension that is relative to a top surface of a substrate.

40. The apparatus of claim 25 wherein the second fiber clamp comprises a lower clamping plate that has a radiused front surface.

41. The apparatus of claim 40 wherein the lower clamping plate comprises individually adjustable segments, wherein each segment is adapted to contact one or more fibers.

42. An apparatus comprising:
a first fiber clamp, the first fiber clamp comprising a set of parallel clamping wheels;
a second fiber clamp, wherein the first and second fiber clamp are adapted to hold a fiber under tension;
a substrate stage adapted to hold a substrate, wherein the substrate comprises a groove; and
a set of fiber guides to align the fiber under tension to the substrate groove.

43. The apparatus of claim 42 wherein each of the clamping wheels are connected to a spring.

44. The apparatus of claim 43 wherein the second fiber clamp comprises an upper clamping block and a lower clamping block, the clamping blocks being adapted to hold the fiber.

* * * * *